Oct. 10, 1961 R. B. LEVINSOHN 3,004,230
ELECTRIC INDUCTOR DEVICES
Filed Oct. 12, 1956 4 Sheets-Sheet 1
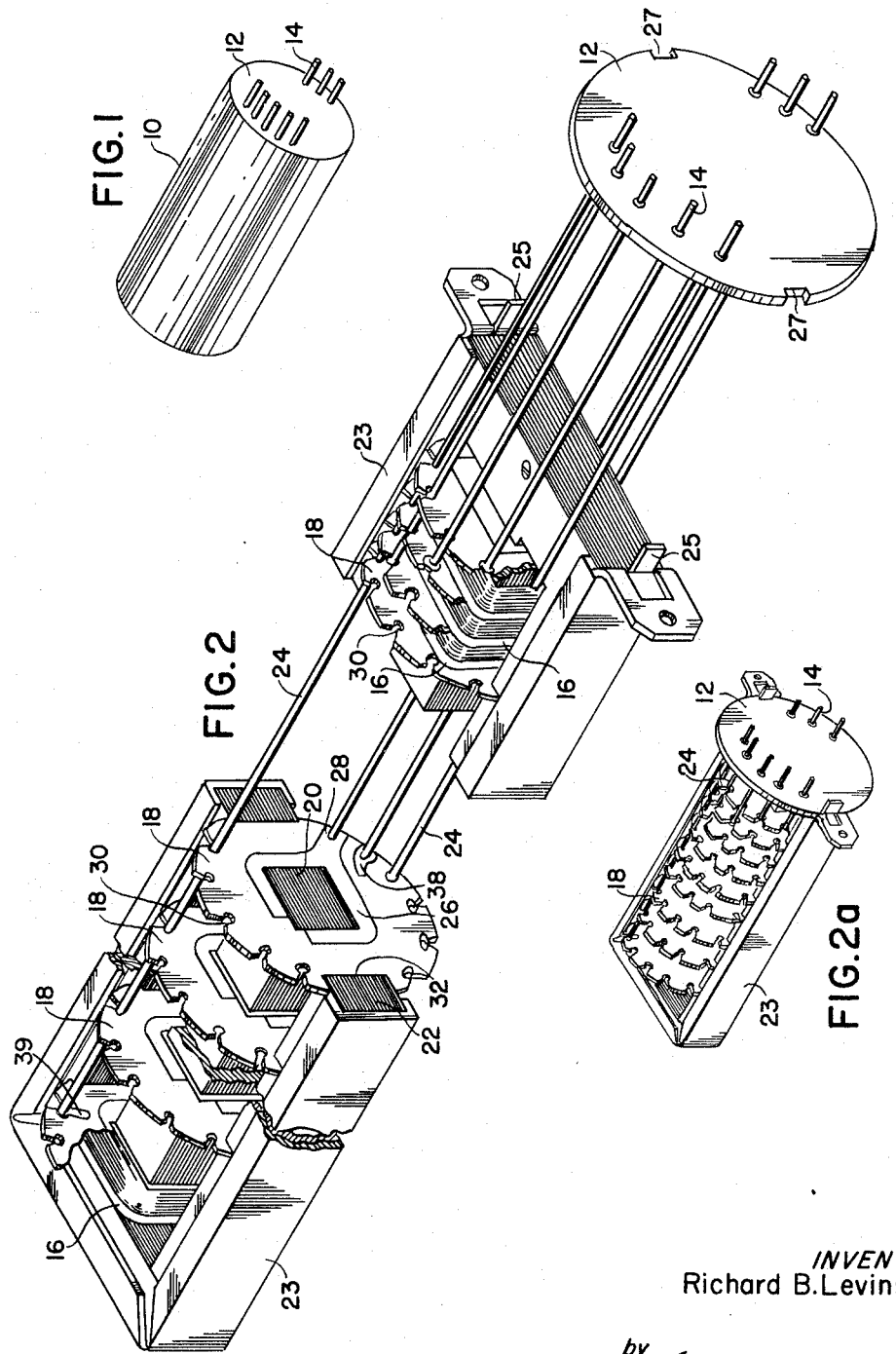
INVENTOR.
Richard B. Levinsohn
by
ATTORNEY Oct. 10, 1961  R. B. LEVINSOHN  3,004,230
ELECTRIC INDUCTOR DEVICES
Filed Oct. 12, 1956  4 Sheets-Sheet 2

INVENTOR
Richard B. Levinsohn by
*Stewart F. Moore*
ATTORNEY

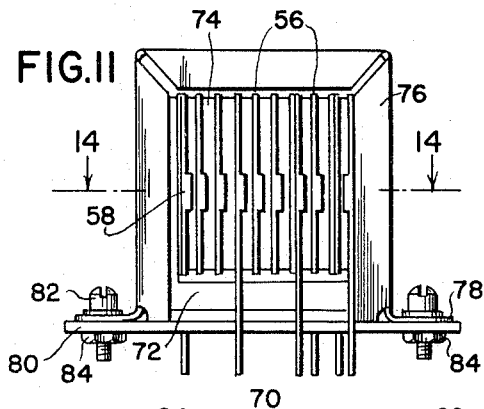
FIG.11
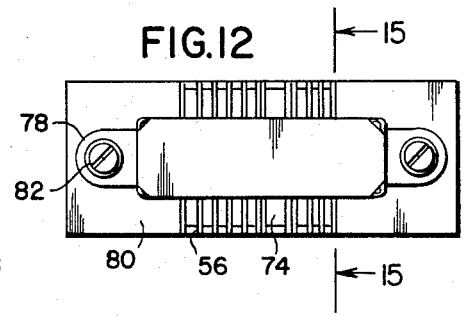
FIG.12
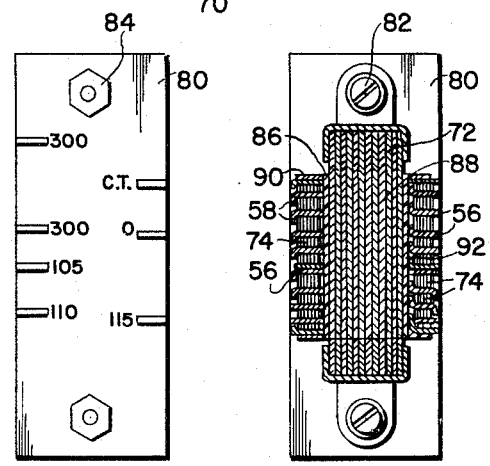
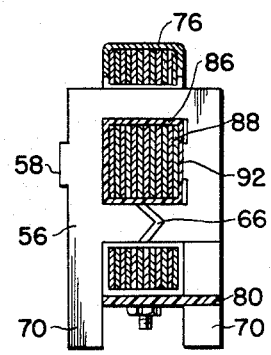
FIG.15
FIG.13   FIG.14
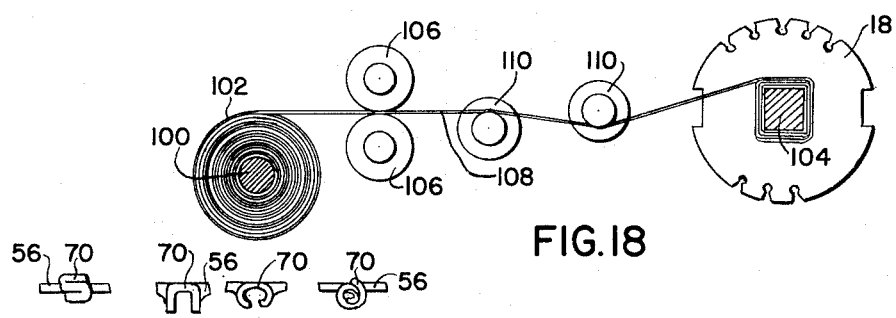
FIG.18
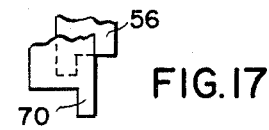
FIG.16
FIG.17
INVENTOR:
Richard B. Levinsohn
by
ATTORNEY INVENTOR:
Richard B. Levinsohn by
ATTORNEY United States Patent Office 3,004,230
Patented Oct. 10, 1961

3,004,230
ELECTRIC INDUCTOR DEVICES
Richard B. Levinsohn, Greenwich, Conn., assignor to American Machine & Foundry Company, a corporation of New Jersey
Filed Oct. 12, 1956, Ser. No. 615,562
24 Claims. (Cl. 336—107)

This invention relates to electric inductor devices and, more particularly, to inductors of the type having spiral coil windings formed from strips of metal foil.

In the past, inductors have been manufactured which utilize thin metal foil wound in a flat spiral form or "wafer" as the requisite coil. A number of such coils are usually assembled on a laminated iron core and electrical connections are made to the ends of the coils or to taps where necessary by employing circular wire conductors therefor. Such connectors defeat the advantages gained by the use of flat conducting foil and, particularly, do not provide a large contact area to the ends of the coils as is needed for good electrical design. Furthermore, the insertion of connecting wires and taps at selected points upon a wafer coil is a delicate operation not adapted to manual accomplishment or to automatic machine production. Also, the space occupied by the wires and associated insulation and the connections made to the ends of the wafers add materially to the overall dimensions of the inductor.

It is accordingly an object of the invention to provide an inductor of compact construction, occupying a minimum of space, which is easily adapted to automatic assembly techniques.

It is another object of the invention to provide an inductor having conductors which furnish connections of large surface area to the inductor coils and which are adapted to be connected to the coils quickly and easily by the use of automatic assembly techniques.

For a better understanding of the invention, together with other and further objects thereof, reference is made to the following detailed description taken in connection with the accompanying drawings, in which:

FIG. 1 is a perspective view of a receptacle for enclosing an embodiment of the present invention.

FIG. 2 is an exploded perspective view of an inductor embodying the principles of the invention.

FIG. 2-A is an assembled view of an inductor embodying the principles of the invention.

Figure 3:
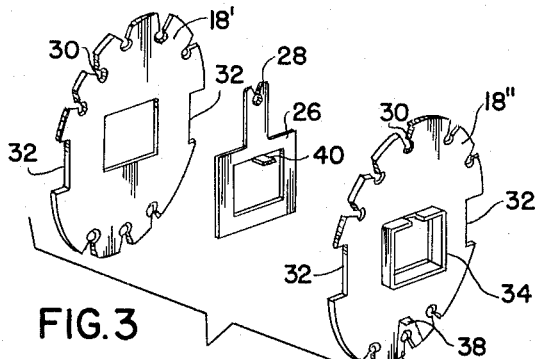

FIG. 3 is an exploded perspective view of an insulated separator card employed in the embodiment of FIG. 2.

Figure 4:
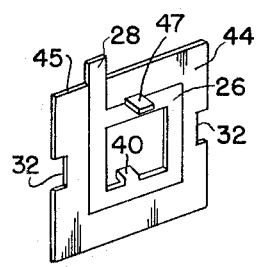

FIG. 4 shows a modification of the separator card arrangement of FIG. 3.

Figure 5:
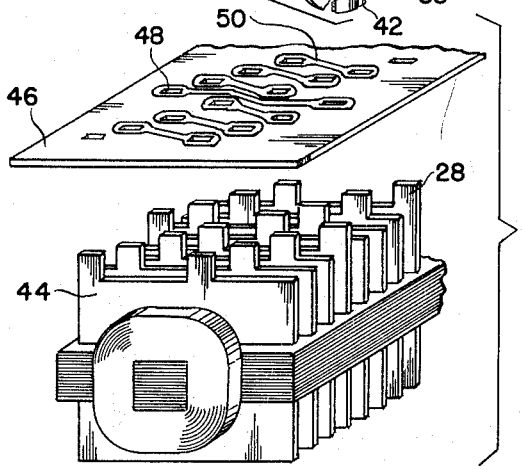

FIG. 5 is a perspective view of another embodiment of the invention.

Figure 6:
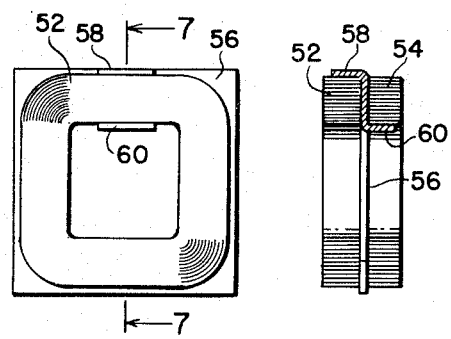

FIG. 6 is an end elevation of a modification of the connector arrangement of FIG. 4.

Figure 7:
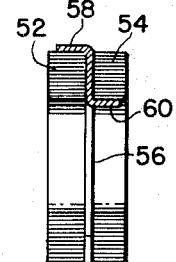

FIG. 7 is a sectional side elevation on line 7—7 of FIG. 6.

Figure 8:
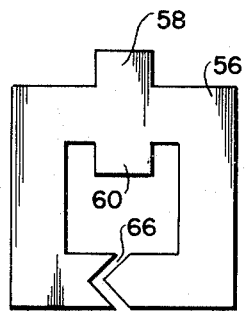

FIG. 8 is an end elevation of the connector leaf embodiment shown in FIG. 6 with the coil removed.

Figure 9:
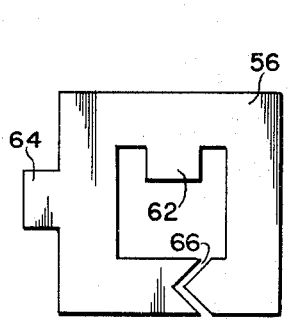

FIG. 9 is a modification of the connector leaf of FIG. 8.

Figure 10:
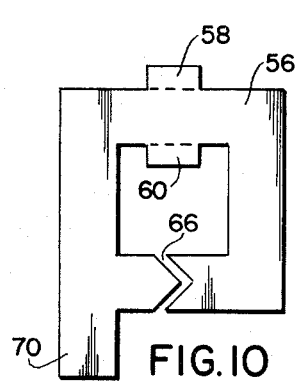

FIG. 10 is another modification of the connector leaf of FIG. 8.

FIG. 11 is a side elevation of another embodiment of the inductor of the present invention.

FIG. 12 is a top view of the inductor of FIG. 11.

FIG. 13 is a bottom view of the inductor of FIG. 11.

FIG. 14 is a sectional top view taken on line 14—14 of FIG. 11.

FIG. 15 is a sectional side elevation taken on the line 15—15 of FIG. 12.

FIG. 16 shows several terminal connectors formed from the conductor leaves of FIG. 10.

FIG. 17 is a terminal arrangement of the conductor leaves of the inductor of FIG. 10.

FIG. 18 is a diagrammatic view illustrating a method for forming and winding the coils of the present invention.

Figure 19:
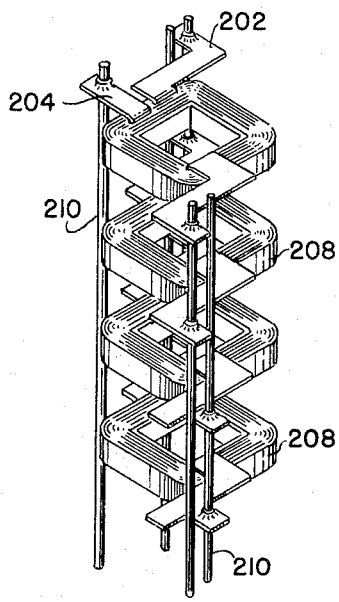
Figure 20:
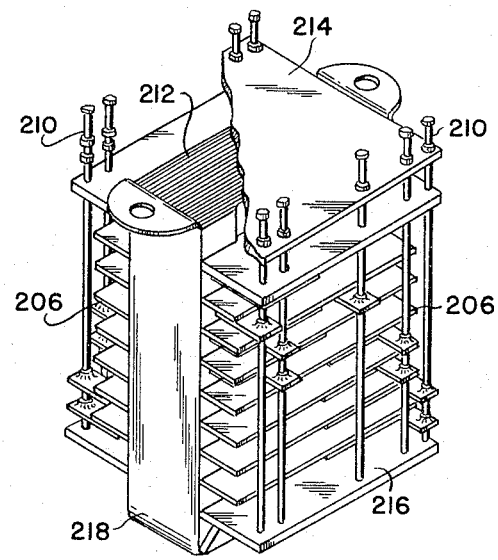

FIG. 19 is a perspective view of a partially assembled embodiment of the invention shown in FIG. 20.

FIG. 20 is a perspective view of another embodiment of the invention.

Figure 21:
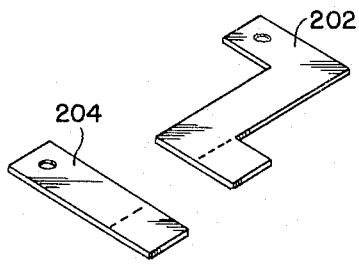

FIG. 21 is a perspective view of conductor configurations employed in the embodiments of FIGS. 19, 20.

Referring now to the drawings, FIG. 1 generally indicates a receptacle 10 for encasing one embodiment of the inductor device of the present invention. Receptacle 10 may be a covering of any suitable type such as a metal container which may be hermetically sealed and filled with resin, a protective wax sheath, a varnish coating or the like, after the electrical components have been assembled and inserted therein. Receptacle 10 has a terminal board 12 forming a rigid base for supporting the inductor assembly, and a plurality of outwardly extending plugs or terminals 14 suitably spaced thereon for mating with a complementary socket usually affixed to a mounting board of suitable electrical apparatus.

One embodiment of the inductor comprising the present invention illustrated in FIG. 2 and 2a has a plurality of spirally wound, disk-like wafers or coils 16 wound from flat metal strip with card-like insulating separators 18, interposed between each coil. The ends of coils 16 and selected tap connections are suitably interconnected where desired as will be described hereinafter and provide a continuous electrical circuit through the stack of coils, with the electrical path usually following throughout the stack the same rotational direction about the stack axis. Coils 16 are formed with central openings having a suitable area so as to rest in assembled arrangement upon laminated magnetic core material 20 which forms with external return members 22 a closed magnetic circuit. Members 22 are partially enclosed in a supporting frame 23 to which terminal board 12 is affixed. Electrical connections are made to the conductors on the insulating separators 18 by means of side rod conductors 24 which extend lengthwise of the inductor and terminate at the terminal board 12 where they are electrically connected to terminals 14.

When used for transformer applications, the coils are generally serially connected. One arrangement for facilitating this connection is to wind the coils alternately clockwise and counter-clockwise, but an identical spiral disposition throughout the transformer is preferred for ease in automatic assembly. With this latter arrangement, a series connection may be provided by connecting the outside end of each coil to the inside end of the coil adjacent to it. Such an arrangement is illustrated in FIG. 2 wherein insulated separators 18 which are interposed between adjacent coils 16 provide the necessary series connections. The conductors for the connectors may be associated with separators 18 in any suitable manner. For example, conventional printed or etched circuit processes may be used to apply these conductors directly to the separators.

Another arrangement particularly suited for supporting a coil by separator 18 is shown in the exploded view of FIG. 3. Here the separator is formed of a composite construction having two outer insulating layers 18' and 18" with a conducting sheet 26 formed into a generally annular configuration sandwiched between them. Connection to a selected side rod conductor 24 is made by a tab 28 leading outwardly from annular conducting sheet 26, while the connection to the inner terminus of an adjacent coil may be made at any suitable point on the inner portion of sheet 26, or to a suitable tab member 40 attached thereto.

Separators 18 are of generally circular configuration and have suitably spaced, peripherally disposed notches 30 for locating the rod-like conductors 24, and wider notches 32 to insure registry with the external magnetic return members 22. Side rod conductors 24 are electrically bonded at suitable points to tabs 28 by soldering, welding or other suitable means. By proper selection of the lengths of conductor 24 and the number of coils 16 bridged between them, the number of coil windings connected between any two of the terminals 14 can be established. The number of external connecting terminals 14 depends then upon the number of different coils required to be independently available in external circuits. Thus, a simple solenoid or loading inductor will require only two terminals bridging the entire stack of coils, whereas a multistep transformer requires a larger number of terminals, such as the inductor shown for purposes of illustration in FIG. 2.

In the construction of the insulated separators 18, shown in detail in FIG. 3, the separator may be formed with a laterally extending flange 34 which may be continuous as shown or interrupted by cutouts or conducting tabs 40 as may be required. Flange 34 forms a support for the coil 16, not shown, which is wound thereon. The conducting sheet 26 is contained between two insulating sheets 18', 18" of paper, fiber or the like. Alternatively, one of the sheets 18', 18" may comprise a coating of plastic material applied over the conducting sheet 26, or the entire assembly may be molded from a plastic material with the conducting sheet 26 inserted therebetween.

The conducting sheet 26 may be suitably modified according to the connections required to be made at selected positions along the stack. The embodiment shown in FIG. 3 is arranged for an external lead connection to an intermediate point or tab in a wafer coil. For this purpose, a tab 38 is bent outwardly from a detached conductor sheet portion 42 after a portion of the coil has been wound. After suitable bonding of the ribbon foil strip to tab 38 has been made, the winding is continued over it. Likewise, the outer, terminating ends of each coil may be connected to a suitably positioned tab, which may be similar to tab 38 but disposed near the outer periphery of separator 18. The rearward portion of a tab construction which connects an end of a coil 16 to a selected conductor is designated as 39 in FIG. 2.

Tab 40, bent outwardly along the separator flange 34 provides an electrical connector to which the foil strip is bonded at the start of the winding while tab 28 provides a terminal for interconnection through conductor rods 24 to the outside end of the next adjacent coil 16. By this means it is possible to connect a selected terminal 14 to any selected point on a designated wafer coil 16.

A modification of the separator is illustrated in FIG. 4. The separator 44 is somewhat similar to separator 18 but differs in that a lineal edge 45 is provided and notches 30 are omitted. However, as described heretofore in connection with FIG. 3, the inner or starting end of a wound coil may be electrically attached to a tab 40, and the outer or "finish" end of a coil may be electrically attached to a similar tab 47. In this manner adjacent coils disposed on either side of separator 44 may be serially connected. After a selected conductor configuration is placed thereon, the separator 44 may be covered with an insulating substance by spraying, dipping or other known film applying techniques.

Instead of terminating in notches, the tabs 28 extend outwardly to project beyond the outer periphery of the separator 44 to serve as terminals directly without the use of intermediate side rod conductors, terminals, or other connectors. A cover sheet 46 of insulating material may be provided with slots 48 arranged to register with each of the tabs 28 of an assembled wafer coil stack, such as shown in FIG. 5. Suitable interconnecting leads 50 may be provided on the surface of sheet 46 for joining any tabs to each other or to external prongs if desired. Leads 50 may be conveniently printed to board 46 or etched or stamped thereon by any of the well-known conventional printed circuit techniques. A junction between tabs 28 and leads 50 is effected by soldering, welding or the like. It will be seen that insulated cover sheet 46 may also act as a convenient terminal board to which connections from associated apparatus may be made.

In some inductor arrangements it is not always desirable to employ insulating separators of the type shown in FIG. 3 wherein a connection between adjacent coils is made directly to one of the terminal tabs 28. It also may be preferable to utilize projecting tabs 28 only as external terminals and make all internal connections between coils by other means. The separator 44 of FIG. 4 may therefore be modified according to the embodiment shown in FIGS. 6, 7, 8 and 9 wherein inter-connections between adjacent coils are made by interposing thin conducting leaves or sheets; which are formed with suitably located tabs. Each tab is bent so as to contact the conducting terminus to which a connection is to be made, in some instances an inside terminus, in other instances an outside terminus, but generally providing a Z-shaped arrangement, when viewed in longitudinal section.

In FIGS. 6 and 7 are shown two similarly oriented wafer coils 52, 54 respectively, both wound in the same spiral direction. A conducting sheet 56, is interposed between coils 52 and 54 and may be insulated with a suitable coating on one or both sides. Sheet 56 is formed with at least two tabs 58 and 60 which extend in the plane of the sheet when it is originally formed by stamping, etching or other suitable means.

When the coils are assembled so that a conducting sheet 56 is interposed therebetween, tabs 58, 60 are bent as shown in FIGS. 6, 7 so as to interconnect the outside of one coil to the inside terminus of the next adjacent coil. The tabs are then electrically bonded to the terminals by any suitable means, although an ultrasonic soldering technique is preferable. While the arrangement shown in FIGS. 6, 7 and 8 provides bonding tabs with a Z-shaped arrangement, yet it will be understood that a number of modifications may be made within the scope of the invention. For example, an additional modification is shown by way of illustration in FIG. 9. As it is not always necessary for tabs 58 and 60 to be located adjacent each other as in FIGS. 6, 7 and 8, they may be moved to any desired azimuthal location, such as indicated by the locations of tabs 62, 64 of FIG. 9.

To prevent the circulation of eddy currents in the conductor sheets 56, it is preferable to interrupt the conductor at any suitable location such as shown in FIGS. 8, 9, 10 by gap 66. When greater rigidity is desired, a thin connector sheet may be bonded to an insulating separator sheet which serves as a backing member. By providing connector sheet 56 of FIG. 8 with a projecting tab 70, such as shown in FIG. 10, it will be seen that the same function provided by the tab 28 of the separator 44 is performed.

An inductor arranged with appropriate taps between wafer coils so as to function as a plate transformer and utilizing the conductor sheets of FIG. 10 is illustrated in FIG. 11.

The core of the transformer shown in FIG. 11, indicated by numeral 72, is built up from a number of thin laminations of iron sheet according to the usual practice. Each of the laminations is formed in two parts to accommodate assembly of the wafer coils 74 onto the core 72. The lamination segments may be arranged to provide, as is well-known in the art, an E—I or C-core arrangement. Core 72 is supported by a channel frame 76 which is formed with attachment lugs 78 which serve to attach it to a terminal board 80 by means of screws 82 and nuts 84. Of course, other suitable fastening means, such as rivets, may be used if desired.

Core 72 is provided with an insulating wrapper 86 which is mounted on a central leg 88 of core 72, which in turn supports the entire coil assembly. The assembly comprises a stack of wafer coils 74 with insulated connector sheets 56 interposed therebetween along with, at selected positions, additional insulating sheets 90. It is desirable to insert additional insulating sheets 90 at points of high potential drop in transformer applications, such as between the primary and secondary circuits and between the end conductors and the grounded ends of the core. Tabs 58 are bent over during the assembly operation to contact the outside terminals of wafer coils 74 whereas tabs 60 formed on the inner edge of the connector sheets 56 are bent into the inner openings of the coils 74 and soldered thereto, as shown in FIG. 14.

Projecting tabs 70 extend through slots or openings suitably formed and located in terminal board 80, in the same manner as employed in the transformer shown in FIG. 5. While tabs 70 may serve directly as terminal connectors, yet this application requires metal of such thickness that a considerable increase in bulk of the transformer would result. However, such terminals may be provided by using thicker connector sheets for those terminals utilized as terminal extensions, whereas the sheets utilized only as inter-coil connections may be very thin. Where certain inductor applications require the use of a large number of external connectors, the dimensional considerations of such an inductor or transformer would dictate the use of thin connector sheets but with modification of the terminal portions to give them additional rigidity. Accordingly, the terminals 70 may be bent for greater rigidity such as shown in FIG. 16. These terminals may be stiffened by the application of solder or the like in the usual manner.

In some applications of the invention, particularly where a large number of narrow coils are required, the disposition of the terminals 70 may result in spacings too close for adequate air-gap insulation. To overcome this difficulty, the terminals 70 may be bent so that the slots in the terminal board are offset from the point of origin of the tabs 70 in the coil assembly. Another modification is to form the tabs as narrow as possible and arrange them so that adjacently projecting tabs are offset in a transverse direction, such as shown in FIG. 17.

Where heating of the transformer is expected to be a problem, the connector sheets 56 may be increased in area to conduct heat outwardly from the interior of the coil 74 and thereby act as radiating fins.

A suitable method for forming the foil strips and winding them on the separators 18 of FIGS. 2, 3 and 4 is illustrated in FIG. 18. A mandrel 100 is rotatably mounted and carries a roll of metal foil 102 of any convenient width. In order to provide insulation between adjacent coil layers in wafers 16, the foil 102 is coated on one side, or both sides if desired, with a suitable insulating material such as plastic varnish or the like. The insulating coating may be applied before rolling of the sheet or it may be applied as foil 102 is unrolled from the roll. Also, a thin sheet of insulating paper may be rolled along with the foil sheet in place of the adhesive coating.

After the mandrel 100 has been loaded with a supply of foil, a number of separators, which will depend on the number of wafer coils to be wound, are mounted on an arbor 104 which is arranged to be driven by any suitable power source. The assembly of separators 18 on the arbor 104 has the configuration of a multiple spool. A sheet of foil 102 is then unrolled and drawn between a plurality of rotary cutting knives 106 which are formed as multiple discs spaced apart the width desired on the finished coils 16. Disc knives 106 are conventional foil cutting knives such as are well-known in the art. The cut foil strips 108 thus formed are led over a pair of tapered separator rollers 110 in the usual manner which serve the function of fanning out and realigning the strips 108 with correct spacing for accommodating the thicknesses of the separators 18. The ends of the foil strips arriving from the separator rollers 110 are bonded to the tabs 40 of the conductors 26 by soldering, welding or similar means.

Arbor 104 is then rotated until the desired number of foil turns have been wound on the coil separators 18. The foil strips are then cut and the coil ends attached to the appropriate tabs 28 for establishing the required inter-coil and external lead connections. Any suitable means (not illustrated) for clamping and holding the foil strips during cutting off and for applying the ends to the cards 18 and for suitable preparation of the foil ends for attachment thereto may be used. When the wafers and cards have been thus prepared, they are removed from arbor 104 and slipped into place on the central leg of inductor core 22.

After the coil assembly has been mounted in place on the core, the entire transformer is secured in a rigid position by a supporting frame or casing 23 which is pressed over the outer surfaces of core 22. Terminal plate 12 is then applied and located and secured to casing 23 by tongues 25 and grooves 27. As mentioned heretofore, the inductor shown in FIG. 2 may be impregnated or placed in receptacle 10 and the entire contents filled with an encapsulating material such as epoxy resin.

Another embodiment of the invention particularly adaptable to automatic machine assembly techniques is shown in FIGS. 19–21. In this embodiment, conducting sheets 202, 204 may be electrically bonded directly to the wafer foil during the winding process. Thus, when each coil is completed, the connector sheets are also properly affixed thereto. Connector sheets 202, 204 are similar to sheets 56 employed in the embodiment of FIGS. 6–14, except that all excess conducting material and particularly that used to encircle the periphery of the core has been removed. It will also be appreciated that the specific configurations of connector sheets 202 and 204 are shown in FIG. 21 merely for purposes of illustration and may be modified to any suitable configuration. As the connector sheets 202, 204 are relatively thin, it is desirable to support the wafer coils and also back up the connector sheets with insulating separators 206 which may be interposed between each coil and connector sheet combination during the assembly process. In FIG. 19 wafer coils 208 are shown having connector sheets 202, 204 electrically affixed thereto which, in turn, are electrically bonded to a plurality of side rod conductors 210. Insulating separators 206 are omitted from the drawings for purposes of clarity, but are incorporated in an assembled unit.

It will be seen that the transformer shown in fully assembled condition in FIG. 20 is particularly adaptable to assembly by machines. Thus, a core 212 may be supported in a suitable jig and the wafer coils with connector sheets 202, 204 previously bonded thereto may be added in a stacked arrangement with the card-like insulating separators interposed between each coil. If desired, side rod conductors 210 may be punched through the projecting ends of sheets 202, 204 to provide a press fit therewith. Of course, during the punching operation sheets 202, 204 may be laterally supported by suitable jigs. Insulating end plates 214, 216 are provided with selectively spaced apertures therein for receiving side rod conductors 210 which, in turn, after insertion through the apertures, may be swaged or otherwise rigidly secured. The protruding ends of the side rod conductors 210 provide terminals for connecting directly to the wafer coils where desired. A conventional frame 218 surrounds core 212 and is suitably slotted at proper intervals to cooperate with insulating separators 206 and insulated end plates 214, 216 so as to hold the component parts in proper alignment.

Any of the embodiments described heretofore may be protected and insulated as a unit by impregnating them with a suitable material such as epoxy resin or the entire unit may be cast in such a material after assembly.

The several embodiments described herein are especially well adapted for the mass production of transformers or other inductors by automatic machinery whereby large savings in costs are achieved along with uniformity in physical and electrical characteristics.

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

I claim:

1. An inductor comprising a plurality of spirally wound coils of flat, insulated metal ribbon stacked along a common magnetic axis, each of said coils being tightly wound with the flat surface of each winding turn thereof abutting adjacent flat surfaces of successive turns, and a plurality of conductive sheets, each sheet having an intermediate portion interposed flat between adjacent coils, an inner portion of each of said sheets projecting axially and electrically connected face to face with the flat surface of the metal ribbon at an internal point on one of the coils, and an outer portion extending sufficiently beyond the coils to provide external connection to said internal point.

2. An inductor according to claim 1, wherein said conductive sheet has tab portions interposed between said coils, said tab portions being disposed to serially connect the flat inner end of a first coil winding with the outer end surface of a second coil winding.

3. An inductor according to claim 1, wherein the outer portion of the conductive sheet extends parallel to the axis of the coils and is electrically connected to the external end of an adjacent coil.

4. An inductor according to claim 3, wherein the intermediate portion of the conductive sheet has an aperture for surrounding a magnetic core, and a discontinuity extending from the aperture and across said intermediate portion to prevent the formation of eddy currents in said sheet.

5. An inductor according to claim 3, wherein a tab portion extends from the intermediate portion of the conductive sheet to define an electrical terminal for the coil connections.

6. An inductor comprising a plurality of spirally wound coils of flat, insulated metal ribbon stacked along a common magnetic axis, each of said coils being tightly wound with the flat surface of each winding turn thereof abutting adjacent flat surfaces of successive turns, and a plurality of conductive sheets, each sheet having an intermediate portion interposed flat between adjacent coils, an inner portion of each of said sheets projecting axially and electrically connected face to face with the flat surface of the metal ribbon at an internal point on one of the coils, and an outer portion extending sufficiently beyond the coils and perpendicular to the axis thereof to define an electrical terminal.

7. An inductor according to claim 6, further comprising an insulating plate having apertures therein for registering with the outer portions of the conductive sheets, said plate having conductive paths thereon for interconnecting selected ones of said sheets.

8. An inductor according to claim 6, further comprising conductive rods disposed parallel to the axis of the coils for making selective connections with the outer portions of the conductive sheets.

9. An inductor according to claim 8 wherein the outer portions of the conductive sheets have notches aligned with the conductive rods for receiving the same in nesting relationship.

10. An inductor according to claim 8, wherein the conductive rods pierce the outer portions of the selected sheets to make connection therewith.

11. An inductor according to claim 10, further comprising an insulated base plate having apertures for receiving the ends of the conductive rods to provide a terminal board for the inductor.

12. An inductor comprising a plurality of spirally wound coils of flat, insulated metal ribbon stacked along a common magnetic axis, each of said coils being tightly wound with the flat surface of each winding turn thereof abutting adjacent flat surfaces of successive turns, and a plurality of conductive sheets, each sheet having an intermediate portion interposed flat between adjacent coils, an inner portion of each of said sheets projecting axially an electrically connected face to face with the flat surface of the metal ribbon at an internal point on one of the coils, an outer portion extending sufficiently beyond the coils and perpendicular to the axis thereof to define an electrical terminal, and an insulating separator interposed between adjacent coils for supporting the intermediate and outer portions of the conductive sheet.

13. An inductor according to claim 12, wherein a flange extends axially from the separator for supporting an adjacent coil and providing insulation between said coil and an associated magnetic core.

14. An inductor according to claim 12, wherein the separator is formed with a hole permitting mounting on the intermediate leg of an E-shaped magnetic core and having cut-out edge portions for engaging the outer legs of said E-shaped core.

15. An inductor according to claim 12, wherein said outer portion comprises an outwardly extending tab and said separator has an elongated portion in register with said tab to provide a backing member therefor.

16. An inductor according to claim 1, further comprising conductive side rods disposed adjacent to said coils and electrically connected to the outer extremities of said conductive sheets to provide terminals for said inductor.

17. The invention defined in claim 16, including an insulated base plate having apertures for receiving the ends of said side rods to provide a terminal board for said inductor, and means for securing said side rods to said plate.

18. The invention defined in claim 16, including insulated members supportably arranged on said common magnetic axis and interposed between adjacent coils, said members having notches disposed about their outer periphery and so arranged that said notches in successive members lie in register with each other, said side rods being nested in said notches, and said outer portions of said conductive sheets being selectively connected to said side rods.

19. The invention defined in claim 18, wherein said outer portions of said sheets are conductive paths formed on said insulated members.

20. The invention defined in claim 1, further comprising insulated backing members interposed between said coils to insulate said outer portions of said sheets from the ends of said coils.

21. An inductor according to claim 1, further comprising an insulating plate having apertures therein for registering with said outer portions of said conductive sheets, said plate having conductive paths thereon disposed in a selected arrangement for selectively interconnecting said outer portions of said sheets.

22. The invention defined in claim 1, wherein said common magnetic axis comprises a magnetic core including a body portion and leg members laterally extending from said body portion to define an E-shaped configuration, said coils being arranged on the intermediate leg of said E-shaped core configuration in axial alignment therewith, insulating separators interposed between adjacent coils and having cutout portions for supportably engaging the outer legs of said E-core, interconnecting side rods disposed adjacent to the legs of said E-core and adapted to interconnect said coils, means disposed about the outer periphery of each of said separators for securing said side rods in alignment with the leg of said E-core, said outer portions of said conductive sheets extending outward sufficiently beyond said coils to contact said side rods.

23. The invention defined in claim 1, wherein said common magnetic axis includes a magnetic core, insulated separators adjacent the ends of said coils and having coil supporting flanges extending therefrom, said flanges being interposed between said coils and said core to provide electrical insulation therebetween, having side rod mounting means disposed about their outer periphery, at least one interconnecting side rod supported by said mounting means and disposed parallel to the axis of said core to provide a projecting electrical terminal, and at least one of said outer portions of said sheets extending sufficiently between the coils to contact said side rods.

24. The invention defined in claim 22, wherein at least one of said conductive sheets has its inner portion mounted on said flange and its outer portion formed as a conductive path on the separator associated with said flange.

References Cited in the file of this patent

UNITED STATES PATENTS

| | | |
|---|---|---|
| 838,423 | Kitsee | Dec. 11, 1906 |
| 2,527,236 | Whitman | Oct. 24, 1950 |
| 2,535,203 | Guthman | Dec. 26, 1950 |
| 2,771,663 | Henry | Nov. 27, 1956 |
| 2,774,014 | Henry | Dec. 11, 1956 |
| 2,786,187 | Nims | Mar. 19, 1957 |
| 2,821,685 | Whitehorn | Jan. 28, 1958 |
| 2,878,455 | Lamberton | Mar. 17, 1959 |